Sept. 1, 1964 H. RENNER 3,147,108
PRODUCTION OF EXTREMELY PURE ZIRCONIUM
Filed Feb. 20, 1963
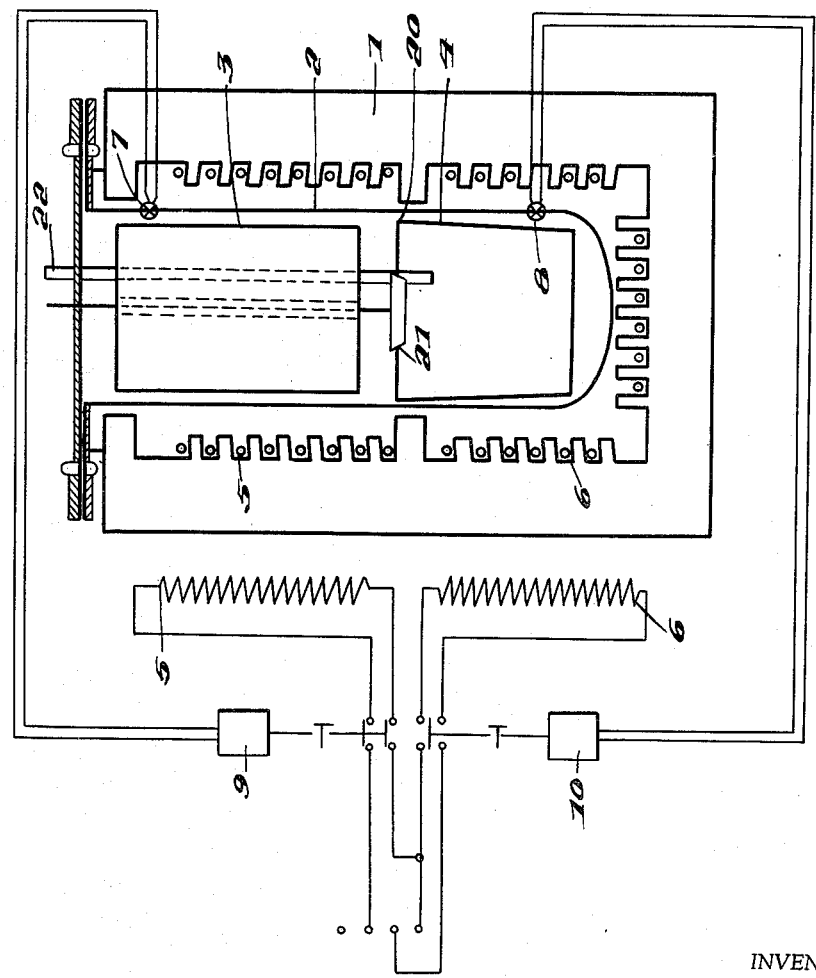
INVENTOR
HERMANN RENNER,
BY
ATTORNEYS United States Patent Office 3,147,108
Patented Sept. 1, 1964

3,147,108
PRODUCTION OF EXTREMELY PURE
ZIRCONIUM
Hermann Renner, Konstanz, Germany, assignor to Deutsche Gold- und Silber-Scheideanstalt vormals Roessler, Frankfurt am Main, Germany
Filed Feb. 20, 1963, Ser. No. 260,008
Claims priority, application, Germany, Feb. 22, 1962,
D 38,206, D 38,207
5 Claims. (Cl. 75—84)

The invention relates to an improved process for the production of zirconium or hafnium of high purity, in which an alkali metal halozirconate or alkali metal halohafnate (double salts of zirconium or hafnium tetrahalide with an alkali metal halide) is first produced from zirconium or hafnium tetrachloride and an alkali metal halide and such double salt is then reacted with a metal acting as a reducing agent to produce metallic zirconium or hafnium.

The production of high purity metals, such as zirconium or hafnium, in general is effected by the reduction of their chlorides with magnesium or other reducing metals. It has also already been proposed first to produce the double sodium-zirconium chloride by passing vapors of zirconium chloride over molten sodium chloride and then to cause the double compound thus produced to react with magnesium so as to produce zirconium metal. In addition, it has furthermore been suggested to carry out this process by placing solid magnesium and solid alkali metal halide in a special reducing vessel in a closed reaction chamber containing an inert atmosphere and subliming $ZrCl_4$ or $HfCl_4$ contained in a separation vessel within the reaction chamber at temperatures between 400 and 650° C. over to the alkali metal halide and magnesium containing vessel first to produce molten alkali metal halozirconate or hafnate from the solid alkali metal halide and subsequently raising the temperature containing the molten double salt and magnesium over the melting point of the latter (650° C.) to effect reduction of the zirconium or hafnium ions contained in the molten double salt with molten magnesium.

In the processes described it was found that the main portion of the heat of reaction is set free within a very short period of time which immediately follows the attainment of the melting point of the magnesium. This causes a danger of overheating, especially in very large reactors, such as are desired for industrial production, because of concentration of the heat of reaction. This leads to heating the reaction zone over the eutectic melting point of ZrFe (940° C.) or of Hf/Fe and therefore to formation of Zr or Hf/Fe alloys by; reaction with the crucible material. In general the resulting contamination of the zirconium or hafnium metal produced is so great that it is not suited for reactor usages.

According to the invention it was now found that the commercial production of extremely pure hafnium or zirconium also can be rendered possible even in very large reaction units by carrying out the reaction in such small portions that no substantial increase in the temperature of the reactants occurs. Preferably the temperature is maintained below 900° C. Therefore, the production of the alkali metal halozirconate or hafnate is carried out in the absence of the reducing metal and the reduction is carried out separately by supplying the reactants in such a way that only small portions of the reactants are capable of reaction at any given period of time, both steps being carried out under an inert atmosphere.

The following possibilities are available for carrying out the reduction step according to the invention:

(1) The total quantity of alkali metal chlorozirconate or hafnate equivalent to a certain amount of magnesium is supplied to the magnesium in molten form in small individual fractional quantities at spaced intervals or continuously (in this instance, however, very slowly) under an inert atmosphere. In other words, the total quantity of magnesium or other reducing metal required for the reduction is placed in the reaction vessel and the double salt supplied thereto in small quantities over a longer period of time. When the additions are made at spaced intervals the next addition is only made after the main reaction and heating caused by the previous addition has occurred and dissipated and such additions continued until all of the reactants have been consumed.

(2) The total quantity of alkali metal chlorozirconate or hafnate is placed in the reaction vessel and the molten reducing metal is added gradually thereto in a manner analogous to the gradual addition of the zirconate or hafnate to the reducing metal in (1).

(3) The total quantities of both reactants gradually are simultaneously supplied to the reaction vessel over a longer period of time, either at spaced intervals or continuously (in this instance, however, again very slowly).

The process according to the present invention in addition to providing the advantage of avoiding occurrence of high temperatures which lead to considerable reduction in the quality of zirconium or hafnium sponge produced has the following further advantages: The alkali metal halozirconate or hafnate can be carried out at relatively high temperatures up to 800° C. so that this reaction proceeds rather rapidly and no special temperature control is necessary.

To expedite the formation of the alkali metal halozirconate or hafnate it is expedient to stir the rather mobile salt melt. The resulting liquid salt melt is then easy to combine with the reducing metal by one of the procedures deschribed above in order to effect the reduction. Liquid magnesium or liquid sodium or a mixture of such metals are especially suited as the reducing metal.

As the metals zirconium and hafnium behave substantially identically, the production of both metals can be carried out analogously and, therefore, in the following for simplicity's sake, the process according to the invention is described only with reference to the production of zirconium.

The accompanying drawing diagrammatically shows an apparatus suitable for carrying out the process according to the invention.

In the apparatus shown in the drawing a reaction vessel 2 is arranged within furnace 1. Two superposed metal (iron) crucibles 3 and 4 are housed within such reaction vessel 2 with a small space therebetween. The furnace is provided with two heating coils 5 and 6 which permit independent regulation of the reaction temperatures in the upper and lower ends of vessel 2. The temperatures are either controlled automatically or by thermocouples 7 and 8 over regulators 9 and 10. Lower crucible 4 is provided with a covering plate 20 having an opening which is closed with a lid 21 which can be operated from the exterior of the furnace.

To carry out the process according to the invention in the apparatus shown in the drawing $ZrCl_4$ is placed in the upper crucible and solid NaCl in the lower crucible. After all of the air has been displaced from the reaction vessel with argon or helium the contents of lower crucible 4 are heated to 800° C. and then the upper crucible 3 is heated to vaporize $ZrCl_4$ and supply the $ZrCl_4$ vapors to crucible 4 until saturation of the NaCl therein is achieved. As soon as such saturation is achieved in the resulting melt, the $ZrCl_4$ vaporization is terminated and reducing crucible 4 closed by application of lid 21. Thereafter the liquid reducing metal, such as magnesium or sodium or preferably a mixture of magnesium and sodium, is gradually supplied to crucible 4 through conduit 22 over a period of time, the reducing metal being supplied at such a rate that the temperature in crucible 4 does not rise above 900° C. The reaction temperature is controlled with the aid of thermocouple 8 or a thermocouple specially provided within the reaction vessel. It is possible to control the quantity of reducing metal supplied automatically depending upon the temperature within the reaction vessel by an appropriate regulator, so that special control over the apparatus by an attendant is unnecessary.

As has already been indicated it can be advantageous to employ a mixture of magnesium and sodium as the reducing metal. Preferably the sodium forms a major portion of such mixture. Such a mixture, for example, can consist of 20% by weight of magnesium and 80% by weight of sodium. Whereas when sodium is used alone as the reducing metal there is a danger that the zirconium is not produced in the form of a compact sponge but rather as a powder containing a relatively large quantity of impurities, it was found that when the mixture is employed a compact zirconium sponge is produced. The reduction itself is carried out at temperatures above the melting point of magnesium and therefore at temperatures over 650° C. to about 800° C. as the formation of the zirconium sponge from the liquid salt and the liquid reducing metal is optimal within this range.

The use of sodium has the advantage that the reducing metal can be produced in very pure form at a relatively low cost, so that the reduction metal itself does not supply impurities such as aluminum boron, iron oxygen and the like to the zirconium metal produced.

I claim:

1. In a process for the production of commercial quantities of an extremely pure metal selected from the group consisting of zirconium and hafnium in which a double salt selected from the group consisting of alkali metal halozirconates and alkali metal halohafnate is first formed from an alkali metal halide and a halide selected from the group consisting of zirconium tetrachloride and hafnium tetrachloride and such double salt is then reduced with a molten reducing metal to produce said pure metal, the step which comprises gradually supplying at least one of the reactants for the reduction to the reaction space over an extended period of time and contacting it in such space with the other reactant, the rate of such gradual supply being sufficiently low that the ensuing exothermic heat of reaction causes substantially no increase in the reaction temperature and that the reaction temperature is held under 900° C.

2. The process of claim 1 in which the entire quantity of molten reducing metal is provided in the reaction space and the double salt is gradually supplied thereto in molten form over the extended period of time.

3. The process of claim 1 in which the entire quantity of double salt is provided in the reaction space in molten form and the molten reducing metal is gradually supplied thereto over the extended period of time.

4. The process of claim 1 in which the reducing metal is a mixture of sodium and magnesium.

5. The process of claim 1 in which the reducing metal is a mixture of about 20% by weight of magnesium and about 80% by weight of sodium.

References Cited in the file of this patent

Bureau of Mines Document BM–RI–5933, "Quality of Zirconium Prepared by Different Reductants," by Elger, January 3, 1961, pp. 2 and 3 relied upon.